April 30, 1929.  W. R. DICK  1,710,971

COOKING UTENSIL

Filed June 15, 1925

Inventor
WILLIAM R. DICK

By A. B. Bowman

Attorney

Patented Apr. 30, 1929.

1,710,971

UNITED STATES PATENT OFFICE.

WILLIAM R. DICK, OF SAN DIEGO, CALIFORNIA.

COOKING UTENSIL.

Application filed June 15, 1925. Serial No. 37,046.

My invention relates to cooking utensils, and the objects of my invention are: First, to provide a cooking utensil whereby the heat from the burner or heating means over which the same is adapted to be positioned is indirectly applied and distributed over the bottom and side walls of the cooking receptacle thereof, and whereby the outer side walls of the supporting receptacle thereof are protected from the intense heat from the burner of other heating means at the lower portion of the utensil; second, to provide a cooking utensil of this class, the bottom of the supporting receptacle of which is perforated and so constructed as to direct the heat from the burner or heating means over which the utensil is positioned upwardly into the interior of the supporting receptacle in such a manner as not to come into direct contact with the outer wall of the supporting receptacle, thus protecting the same against the intense heat from the burner or other heating means; third, to provide a cooking utensil having a raised perforated bottom and means in connection therewith for opening and closing the perforations therein from the outside of the supporting receptacle as and when desired; fourth, to provide a cooking utensil of this class having a supporting receptacle, the outer side wall of which is made of aluminum or other similar bright metal, and the bottom of which is made of iron or other metal having a relatively high melting point and being a relatively poor conductor of heat, and which is so constructed as to direct the heat from the burner or other heating means over which the utensil is positioned, upwardly into the interior of the supporting receptacle; fifth, to provide as a whole a novelly constructed cooking utensil, and sixth, to provide a utensil of this class which is very simple and economical of construction proportionate to its functions, durable, highly efficient, and which will not readily deteriorate or get out of order.

Figure 1:
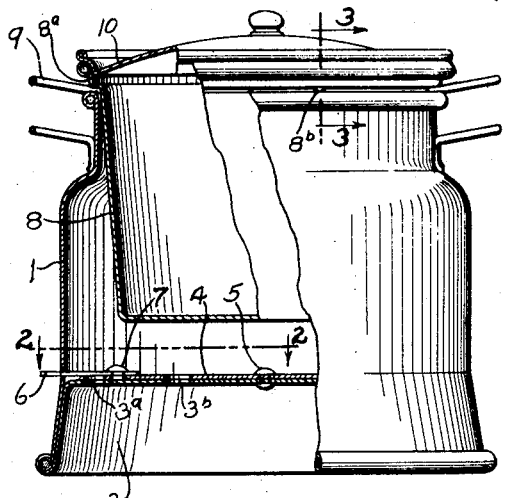
Figure 3:
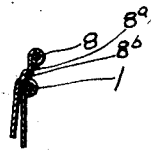
Figure 2:
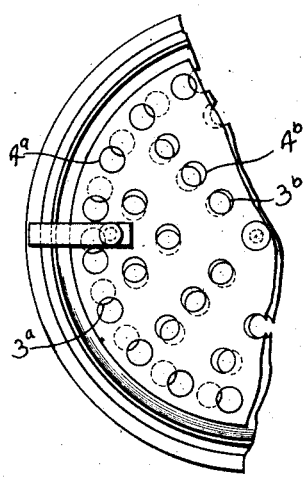
Figure 4:
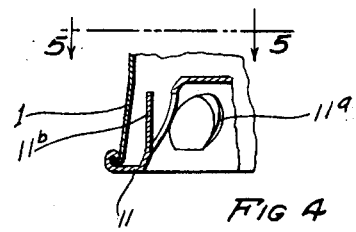
Figure 5:
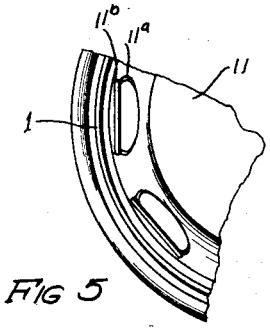

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a side elevational view of my cooking utensil, showing certain parts and portions thereof broken away and in section to facilitate the illustration; Fig. 2 is a fragmentary sectional view thereof in plan, taken through 2—2 of Fig. 1; Fig. 3 is a fragmentary sectional view thereof, taken through 3—3 of Fig. 1, showing the auxiliary means for spacing the upper end of the cooking receptacle from the upper end of the supporting receptacle; Fig. 4 is a fragmentary sectional elevational view of the bottom portion of my cooking utensil in a slightly modified form of construction, and Fig. 5 is a fragmentary sectional view thereof in plan, taken at 5—5 of Fig. 4.

Like characters of reference refer to similar parts and portions throughout the several views of the drawings.

Referring to Figs. 1, 2 and 3 of the drawings, showing my cooking utensil in its preferred form of construction, the outer heat retaining, or supporting receptacle 1 is substantially cylindrically shaped with its upper end slightly offset inwardly and its lower end slightly flared outwardly. This receptacle 1 is provided near its upper end with a handle means, such as a pair of handles 2, secured near the upper end thereof. Within the outwardly flared lower portion of said heat retaining and supporting receptacle 1 is positioned an inverted dish-like heat diverting member 3 which is secured at its lower end to the lower end of the receptacle 1, preferably by rolling said end into the lower end of said receptacle. The side wall of the heat diverting member 3 is preferably positioned in engagement with the inner surface of the flared portion of said receptacle, as shown. The upper or plate portion of the heat diverting member 3, extending transversely across the receptacle 1, is provided near its periphery with a plurality of ports 3ª for permitting the hot gases from the burner or other heating means, over which the utensil is adapted to be positioned, to pass upwardly into the interior of the outer receptacle 1. The middle portion of the plate portion of the heat diverting member 3 is also provided with ports 3ᵇ which are spaced inwardly from the peripherally arranged port 3ᵃ, as shown best in Fig. 2. At the upper side of the plate portion of the heat diverting member 3 is positioned a circular heat controlling plate 4, which is rotatably connected, by means of a rivet 5, at its center with the center of the plate portion of the member 3. Said plate 4 is also provided with a plurality of peripherally arranged ports 4ᵃ and other ports 4ᵇ adapted to separately register with the ports 3ᵃ and 3ᵇ, respectively, in such a manner that when the ports 3ᵃ are wholly uncovered, the ports 3ᵇ are wholly closed, and that when the ports 3ᵇ are wholly opened, the other ports are closed. At the upper side and near the periphery of the plate 4 is secured an arm 6 in any suitable manner, such as by a rivet 7 and a downwardly bent portion at the inner end of the arm, as shown best in Fig. 1. Said arm 6 extends outwardly through an arcuate slot in the side wall of the outer heat retaining and supporting receptacle 1, as shown in Figs. 1 and 2, for shifting the heat controlling plate 4 relatively to the ported plate of the heat diverting member 3, as desired.

Within the upper portion of the outer heat retaining and supporting receptacle 1 is positioned a cooking receptacle 8, which is spaced at its bottom a considerable distance from the heat diverting member 3 and at the upper portion of its side wall from the inner side of the upper or contracted portion of the receptacle 1. The upper portion of the receptacle 8 is provided with an annular outwardly extending shoulder 8ᵃ which supports said receptacle on the upper end of the outer receptacle 1 by means of a pair of oppositely disposed and outwardly extending handle members 9 and a plurality of downwardly extending depressions or lugs 8ᵇ, preferably formed by indenting the flat portion of the shoulder 8ᵃ downwardly, as shown in Figs. 1 and 2. The handle members 9 are secured to the receptacles 8 below the shoulder 8ᵃ thereof and extend a short distance downwardly from said shoulder, thus spacing the inner or cooking receptacle 8 above the upper end of the outer or supporting receptacle 1, and also inwardly from the same. The indentures or lugs 8ᵇ perform similar functions in spacing the inner or cooking receptacle 8 relatively to the receptacle 1. Thus a space is provided between the upper ends of both of the receptacles to permit the escape of the hot gases from the interior of the receptacle 1. The upper open end of the inner or cooking receptacle 8 is provided with a cover 10 of any suitable construction.

It will be here noted that pans and other cooking utensils used today are usually made of aluminum, granite ware or other similar materials, which often melt or are otherwise injured by the intense heat to which they are often subjected. The outer or supporting receptacle 1, the inner or cooking receptacle 8 and the cover 10 of my utensil are made of a relatively light gage aluminum, or the same may be made of granite ware. To protect the lower portion of the outer receptacle 1 from the intense heat of the heating means over which the utensil is adapted to be positioned, the heat diverting member 3 is made from a relatively heavier gage of heat resisting sheet metal, such as iron, Monel metal, or other metals of relatively higher melting points. By a certain combination of metals a presentable utensil is provided, which is, at the same time, protected from injury by heat. The ports 3ᵃ, near the periphery of the plate portion of the heat diverting member 3, are also so positioned that the hot gases from the burner do not impinge directly against the inner wall of the inner receptacle, but are rather diffused when passing through the ports 3ᵃ. When the ports 3ᵇ are uncovered, the hot gases impinge directly against the bottom of the receptacle 8, but the ports 3ᵇ are only uncovered when desiring intense heat as when beginning the cooking operation, in which event the heat is rapidly conducted away from the walls of the receptacle 8 by the food or other product contained therein.

In the modified form of construction of my cooking utensil, shown in Figs. 4 and 5 of the drawings, the side wall of the heat diverting member, indicated by 11, also converges upwardly, but is spaced from the outwardly flaring lower portion of the outer receptacle 1. In this inclined side wall of the heat diverting member 11 is provided a plurality of openings 11ᵃ through which the hot gases from the burner, over which the utensil is adapted to be positioned, are permitted to enter the interior of the receptacle 1, the hot gases entering the interior of the receptacle being deflected upwardly or inwardly from the inner side walls of the receptacle 1 by wings or vanes 11ᵇ, preferably formed by punching the holes 11ᵃ from the side walls of the heat diverting member 11, said wings or vanes 11ᵇ being integrally secured at their lower edges to said heat diverting members. Thus a similar function is performed in this modified form of construction to that described in connection with the preferred structure.

Though I have shown and described a particular construction, combination and arrangement of parts and portions and a certain modification thereof, I do not wish to be limited to this particular construction, combination and arrangement nor to the modification, but desire to include in the scope of my invention the construction, combination and arrangement substantially as set forth in the appended claims.

Having thus described my invention, what I claim as new and desire to secure by Letters Patent is:

1. In a utensil of the class described, an outer supporting receptacle having a laterally expanded portion extending the greater part from its lower end upwardly and providing with a contracted upper end, an inner receptacle extending within said outer receptacle and spaced with its lower end a considerable distance from the lower end of the latter, said inner receptacle being provided with means near its upper end for supporting the same at the upper contracted end of the outer receptacle, the side walls of the inner receptacle extending substantially vertically forming with the wall of the expanded lower portion of the outer receptacle a large air space from the lower end of the inner receptacle to the contracted upper portion of the outer receptacle, the outer receptacle being provided with a raised bottom having a plurality of ports therein, said ports being so arranged as to divert hot gases from the lower side thereof directly into the space between the side walls of the two receptacles and only indirectly against the side wall of the inner receptacle.

2. In a utensil of the class described, an outer supporting receptacle having a bottom extending the full distance between its side walls, an inner cooking or heating receptacle supported therein with its bottom and side walls spaced respectively from the bottom and side walls of the outer supporting receptacle, the bottom of the latter being provided at its periphery with ports and at its middle portion with other ports, and a heat controlling plate shiftably mounted relatively to the bottom of the outer receptacle and provided with ports arranged similarly to those of the bottom of the outer receptacle and adapted to alternately and separately register with respectively the ports at the periphery and at the middle portion of the latter.

3. In a utensil of the class described, an outer supporting receptacle for supporting within and at its upper portion a cooking or heating receptacle, said outer supporting receptacle being made of material readily affected by heat, the lower portion of the side walls thereof being downwardly diverging, and a heat diverting bottom member made of heat resisting metal and having downwardly diverging side walls conforming in inclination with the downwardly diverging lower wall portions of the outer supporting receptacle and positioned in engagement therewith with the lower portions of the heat diverting member secured below and around the lower edge of the outer supporting receptacle, said heat diverting member being provided at its upper portion with passages for admitting hot gases from its lower to its upper side.

In testimony whereof, I have hereunto set my hand at San Diego, California, this 8th day of June, 1925.

WILLIAM R. DICK.